United States Patent Office 3,319,420
Patented May 16, 1967

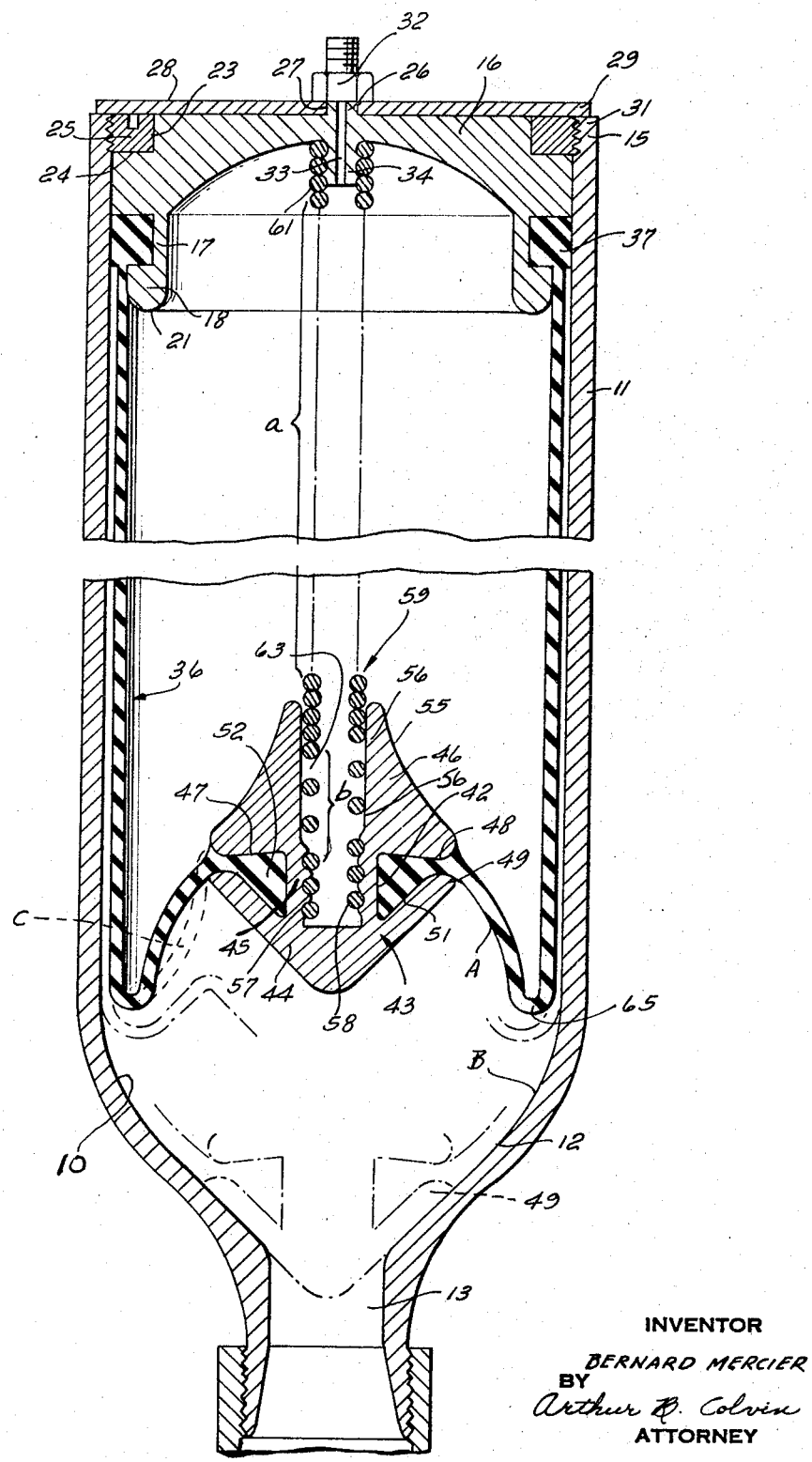

3,319,420
PRESSURE VESSEL
Bernard Mercier, New York, N.Y., assignor, by mesne assignments, to Olaer Patent Company, a corporation of Luxembourg
Filed July 20, 1965, Ser. No. 473,434
14 Claims. (Cl. 60—54.6)

As conducive to an understanding of the invention, it is noted that in pressure vessels comprising a rigid shell or container having a port at each end with a deformable partition or bladder intervening between the ports and defining two chambers to separate fluids contained therein, where the unit remains in standby condition for a considerable period of time, if the intervening partition or bladder is of permeable material, there may be a transfer between the fluids in the chambers defined on each side of the bladder. Where, for example, one of the fluids is gas under pressure, the resultant transfer of such gas into the other fluid which may be an oil, would cause the oil to become more or less elastic with the result that when it was desired to use the unit to provide a large supply of oil under high pressure to operate a hydraulic jack controlling a circuit breaker, for example, the oil, since it is charged with gas, would not provide dependable operation of the hydraulic jack with resultant malfunctioning of the circuit breaker.

Furthermore, if the pressure vessel is used to supply oil to a transformer, if the gas should dissolve in the oil, due to the ionization of such gas, an electric arc may occur.

In addition, where the partition or bladder is of natural or synthetic rubber and the accumulator is used to handle fluids that react with such material, deterioration of such partition or bladder will occur rapidly with resultant malfunctioning or failure of the accumulator.

Where, to solve such problems, the bladder is made of flexible material of relatively little elasticity such as "nylon" or "Mylar" whose impermeability to gas is greatly superior to that of an elastomer such as natural rubber or synthetic rubber, certain problems have resulted.

Thus, for example, since a bladder of this type is substantially non-stretchable, it must be of dimensions substantially equal to the inner dimensions of the container in which it is positioned. Otherwise, upon expansion of the bladder in use, since it is non-stretchable, it would rupture since it would have no support afforded by the wall of the container.

By reason of such non-elastic bladder, however, when the bladder is in compressed condition with the container charged with liquid, and the valve controlling the liquid port is opened, since the bladder is non-elastic, it would quickly move to the oil port and the latter would close in conventional manner before full discharge of oil.

It is accordingly among the objects of the invention to provide a pressure vessel of the above type that may be readily fabricated at low cost, which will employ a substantially non-stretchable fluid impermeable partition or bladder between the opposed ports thereof to prevent transfer of fluids through the partition and in which the oil port will remain in open position until substantially all of the oil has been discharged from the container without likelihood of extrusion of the non-stretchable partition therefrom and which will provide discharge of substantially all of the oil in the container.

According to the invention, these objects are accomplished by the arrangement and combination of elements hereinafter described and more particularly recited in the claims.

Referring now to the drawing, the single figure is a longitudinal cross sectional view of a pressure vessel according to the invention.

Referring now to the drawing, the pressure vessel comprises an elongated container 11, illustratively substantially cylindrical along the major portion of its length and having a substantially frusto-conical or tapered wall portion 12 at one end leading into the axial outlet port 13, with the wall portion 10 of the container between the cylindrical portion and the tapered portion 12 being rounded. The container 11 has a mouth 15 of diameter substantially equal to the inner diameter of the container which is closed by a cover member 16.

As is clearly shown in the drawing, the cover member 16 is substantially cup-shaped, having an external annular groove 17 in its side wall with the portion of said side wall inwardly of said annular groove being of reduced outer diameter as at 18 and having a rounded lower end as at 21. The cover member has an annular recess 23 in its top surface adjacent its periphery which defines a shoulder 24 adapted to abut against a locking ring 25 which is screwed into the correspondingly threaded end of the mouth 15 of the container by means of a spanner wrench, for example.

The cover member 16 has an upstanding axial stem 26 which extends through a corresponding axial opening 27 in a locking plate 28 of diameter greater than that of the inner diameter of the container so that the periphery of the plate 28 may seat on the free end 31 of said container. The stem 26 is externally threaded to receive a locking nut 32 and also has a central bore 33 which extends through the cover 28 and a depending axial stem 34 to permit charging of a fluid into the container in the manner to be hereinafter described.

As is clearly shown in the drawing, a deformable partition in the form of an elongated bladder 36 of substantially non-stretchable fluid impermeable plastic material such as of "Mylar" or "nylon," for example, is positioned in the container. The bladder 36 has an enlarged peripheral rim 37 at its mouth which is positioned in the annular groove 17 of the cover member 16 and clamped against the adjacent wall surface of the container, dependably to retain the bladder in position and provide a seal. As shown, the ladder 36 is of dimensions substantially equal to the inner dimensions of the container so that in inflated but substantially unstretched condition it will rest against the inner wall surface of the container, and the wall thickness of its cylindrical portion progressively increases slightly from the mouth of the bladder. The lower end of the bladder 36 remote from the mouth thereof has an axial opening 42 in which a valve member 43 is positioned. As is clearly shown in the drawing, the valve member illustratively shown, comprises a substantially conical valve head 44 having a concave interior, the side wall of the valve head 44 has an inclination substantially equal to that of the tapered portion of the shell adjacent the oil port 13 to permit accurate seating thereon as shown in broken lines, for closure of such oil port.

The valve head 44 has an axial stem 45 rising therefrom and then has an enlarged portion 46, the lower surface 47 of which extends laterally outward, defining a narrow annular passageway 48 with respect to the periphery 49 of the valve head 44. As a result, a substantially triangular annular cavity 51 is formed so that when the bladder 36 is molded and bonded, at least to the cylindrical wall of cavity 51 of the valve member, an enlarged peripheral portion 52 will be formed, defining the opening 42 in the bladder which will remain dependably locked in said cavity 51. The enlarged portion 46 also has an inclined outer surface shown at 55 and an axial bore 56 extends through said portion 46 into the stem 45 of the valve head 44.

The inner wall surface of the bore 56 in the stem 45 is internally threaded as at 57 to be engaged by the closely spaced convolutions 58 at the lower end of a coil spring 59, the latter extending through the bore in portion 46 of the valve member and then axially with respect to the container. The upper end 61 of said coil spring 59 is screwed onto the threaded outer surface of stem 34.

As is shown in the drawing, the convolutions "a" of the coil spring 59 between the upper end of portion 46 of valve member 43 and the stem 34 are closely spaced, whereas the convolutions "b" of the coil spring positioned in the bore of said portion 46 are widely spaced as at 63 to act as a shock absorber in the manner hereinafter to be described. Thus the convolutions "a" are prestressed and will require a force thereagainst of say twenty pounds for extension thereof, and the convolutions "b" are not prestressed and will extend substantially as soon as force is exerted thereagainst.

The coil spring 59 is of such length with respect to the length of the container 11 and the length of the bladder 36, that when the unit is assembled with the spring unstressed, the lower central portion of the bladder will be pulled upwardly and will be retained in a plane further from the oil port than the lower end 65 of the cylindrical portion of the bladder and the plane of the apex of the valve head preferably is inwardly of the lower end of the cylindrical portion of the bladder. Furthermore, the portion A of the bladder wall between the periphery 49 of the valve head 44 and the lower end 65 of the cylindrical portion of the bladder adjacent the wall of the container is substantially equal to the length B of the container wall between such lower end 65 and the periphery 49 of the valve head 44 when the latter is seated on the tapered portion 12 of the container to close the oil port 13.

When the pressure vessel is completely uncharged, the bladder will be in the position shown in the drawing.

To charge the pressure vessel with oil under pressure, it is merely necessary to open a valve (not shown) controlling the oil port 13. As a result, such oil will flow through the oil port, abutting against the valve head 44 and quickly moving the latter off its seat. Introduction of such oil under pressure will cause the bladder to be compressed, the coil spring acting as a central guide member for the bladder to prevent sharp folds forming therein. By reason of the shock absorbing action provided by the spaced convolutions 63 of the coil spring 59, any impact which might otherwise result at the end of the rapid upward movement of the valve head will be absorbed, preventing damage to the bladder at its axial region where it is secured to the valve head, which would occur if the coil spring only had closely spaced convolutions.

It is apparent that by reason of the coil spring, when the container is charged with oil, the valve head 44 would be retained in the position shown in the drawing, i.e., it would be spaced from the oil port 13 by a relatively great distance and the bladder will be retained against the coil spring.

When gas under pressure is then forced through bore 33 of stem 34 to expel the oil charged into pressure vessel through the port 13, it will pass through the convolutions of the coil spring 59 to charge the bladder 36.

When the gas is first forced into the bladder, by reason of the tension of the convolutions a of the coil spring, the force exerted against the coil spring by the lower end of the partially charged bladder, will not be sufficient to cause any substantial downward movement of the valve head, the few convolutions b only elongating a fraction of an inch. However, the portion of the bladder wall A will move outwardly to the broken line shown at C by reason of the initial pressure buildup in the bladder and the cylindrical portion of the bladder will move laterally outward substantially to the position shown in the drawing. As a result of the expansion of the bladder, oil will be expelled from the container through port 13. Thereupon, with slight further increase in the gas pressure in the bladder, the cylindrical portion of the bladder will press against the container wall for further discharge of oil from the container. So long as the force exerted against the coil spring is not sufficient to cause stretching of the prestressed convolutions a, any slight spreading of the convolutions b will only cause slight movement of the valve member.

As the gas pressure is still further increased, the force exerted by convolutions a will be overcome and the valve head 44 will move downwardly until it finally seats on the tapered portion 12 of the container wall adjacent the port 13, any shock due to such seating being taken up by the convolutions b. During the course of the movement of the valve head above described, since there will be force exerted by the gas under pressure against the portion A of the bladder wall, such portion will also move downwardly. By reason of the fact that the length of such portion A is substantially equal to the distance B between the lower end 65 of the cylindrical portion of the bladder and the periphery 49 of the valve head when seated, it is apparent that such portion A will gradually unfold, following the contour of the tapered lower end 12 of the container until the valve head is seated. As a result of this arrangement, it is apparent that before any portion of the bladder wall can extrude through the oil port 13, the valve head 44 would have seated and sealed such oil port to prevent such extrusion.

With the arrangement above described, it is apparent that a substantially non-elastic bladder may be used in a pressure vessel of the above type with assurance that there will be no extrusion of the bladder from the oil port of the pressure vessel and with assurance that there will be dependable closure of such oil port when there has been substantially full discharge of liquid therefrom.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A pressure vessel comprising a rigid container having a fluid port at one end, a deformable bladder of substantially non-stretchable material positioned in said container, said bladder being of volume and shape substantially the same as the container and being closed at one end, said closed end carrying a valve member adapted to seat against said port to close the latter, resilient means normally retaining said valve member spaced from said port, said resilient means having two portions, one of said portions having normally prestressed coil spring convolutions and the other having normally unstressed spaced coil spring convolutions, said first portion being of greater length than said second portion.

2. The combination set forth in claim 1 which said bladder is of dimension slightly less than that of the container.

3. A pressure vessel comprising a rigid container having an elongated substantially cylindrical body portion having a fluid port at one end defining a seat, a deformable bladder of substantially non-stretchable material having a mouth at one end and closed at its other end, means to secure said bladder mouth in said container at the end thereof remote from the fluid port, elongated resilient means positioned in said container and extending axially thereof, said resilient means having one end secured with respect to the central portion of the closed end of the bladder and its other end secured to the container at the end thereof remote from said fluid port, said bladder having a wall portion that is substantially cylindrical and of diameter slightly smaller than the inner diameter of the cylindrical portion of the container, said resilient means having a length when unstretched to retain the central portion of the closed end of the bladder in a plane further from the oil port than the lower end of the cylindrical portion of the bladder, valve means defined at the central portion of the closed end of the bladder and adapted to move against said seat to close the fluid port, the length of the bladder wall between the valve means and the lower end of cylindrical portion of the bladder when the resilient means is unstretched, being substantially equal to the distance along the inner wall surface of the container from the portion thereof adjacent the lower end of the cylindrical portion of the bladder to the innermost portion of the valve means when the latter is seated.

4. The combination set forth in claim 3 in which said resilient means has two portions, one of said portions having normally pre-stressed coil spring convolutions and the other having normally unstressed spaced coil spring convolutions, whereby when force is applied to said resilient means to stretch the latter, the spaced convolutions will spread further apart prior to any substantial spreading of the pre-stressed convolutions.

5. The combination set forth in claim 4 in which the length of the prestressed coil spring convolutions is considerably greater than that of the unstressed coil spring convolutions.

6. The combination set forth in claim 3 in which said valve means comprises a substantially conical valve head.

7. The combination set forth in claim 3 in which said resilient means comprises an elongated coil spring extending axially of said valve head and secured thereto.

8. The combination set forth in claim 3 in which said valve means comprises a substantially conical valve head, the apex of said valve head being directed toward said port, the plane of said apex normally being inwardly of the lower end of the cylindrical portion of said bladder.

9. The combination set forth in claim 3 in which the container has a substantially frusto-conical wall surface at one end defining the fluid port at its smaller diameter end and the portion of the wall of said container between the cylindrical body portion and the frusto-conical wall surface is curved.

10. The combination set forth in claim 3 in which said resilient member comprises a coil spring having substantially tightly wound convolutions along the major portion of its length and having spaced convolutions along a smaller portion of its length axially aligned with said first portion to define a shock absorber.

11. The combination set forth in claim 3 in which a rigid cover member is secured in the end of the container remote from the fluid port, said cover member having an axial stem extending into the container, a second fluid port extends through said cover member into said container, said resilient member comprises a coil spring having substantially tightly wound convolutions along the major portion of its length, one end of said coil spring being secured to said axial stem and the other end being secured with respect to said valve means, said coil spring having spaced convolutions along the portion of its length adjacent the valve means to define a shock absorber.

12. The combination set forth in claim 3 in which said valve means comprises a valve head having a conical outer wall surface and a concavity therein with an axial member rising therefrom, said axial member having an enlarged portion extending laterally over the concavity in said valve head to define an annular recess that is substantially triangular in cross section having a relatively narrow annular opening, said closed end of the bladder having an axial opening with a peripheral rim positioned in said annular recess and filling the latter for secure retention of the valve head to said bladder.

13. The combination set forth in claim 12 in which said aixal member has a bore opening at its inner end, a rigid cover member is secured in the end of the container remote from the fluid port, said cover member having an axial stem extending into the container, a second fluid port extends through said cover member into said container, said resilient member comprises a coil spring having substantially tightly wound convolutions along the major portion of its length, one end of the coil spring being secured to said stem, the other end of the coil spring being positioned in the bore in said axial member and being secured in the end of the bore adjacent the valve head, the portion of the coil spring in the bore between the secured portion thereof and the inner end of the bore having spaced convolutions to define a shock absorber.

14. The combination set forth in claim 13 in which said stem has an axial bore defining the second fluid port, the outer surface of the stem and the end of the bore in said valve member adjacent the valve head having helical grooves to receive the tightly wound convolutions of the ends of the coil spring for secure retention thereof.

No references cited.

MARTIN P. SCHWADRON, *Primary Examiner.*

R. R. BUNEVICH, *Assistant Examiner.*